United States Patent [19]

Meeker

[11] Patent Number: 5,566,817

[45] Date of Patent: Oct. 22, 1996

[54] CONVEYOR BELT

[76] Inventor: William A. Meeker, 362 Wren La., Strasburg, Va. 22657

[21] Appl. No.: 454,725

[22] Filed: May 31, 1995

[51] Int. Cl.⁶ ................................................ B65G 15/54
[52] U.S. Cl. ........................................ 198/848; 198/853
[58] Field of Search .................................. 198/778, 848, 198/851, 853

[56] References Cited

U.S. PATENT DOCUMENTS

| | | |
|---|---|---|
| Re. 27,690 | 7/1973 | Roinestad et al. . |
| 912,600 | 2/1909 | McPherson ...................... 198/853 X |
| 1,354,553 | 10/1920 | Harter . |
| 2,872,023 | 2/1959 | Bechtel, Jr. . |
| 3,045,809 | 7/1962 | Bechtel, Jr. ........................ 198/853 |
| 3,225,898 | 12/1965 | Roinestad . |
| 3,774,752 | 11/1973 | Harvey . |
| 3,799,328 | 3/1974 | Harvey . |
| 3,870,141 | 3/1975 | Lapeyre et al. . |
| 3,915,025 | 10/1975 | Poerink . |
| 3,920,117 | 11/1975 | Roinestad ........................... 198/853 |
| 3,977,514 | 8/1976 | Kaess ................................. 198/853 |
| 4,078,655 | 3/1978 | Roinestad . |
| 4,394,901 | 7/1983 | Roinestad . |
| 4,557,374 | 12/1985 | Bode . |
| 4,846,339 | 7/1989 | Roinestad . |
| 4,941,568 | 7/1990 | Lapeyre . |
| 4,974,724 | 12/1990 | Lapeyre . |
| 5,004,097 | 4/1991 | Roinestad et al. . |
| 5,083,659 | 1/1992 | Bode et al. . |
| 5,197,591 | 3/1993 | Roinestad et al. . |
| 5,253,749 | 10/1993 | Ensch . |
| 5,265,715 | 11/1993 | Yoshimura et al. ............. 198/853 X |

*Primary Examiner*—D. Glenn Dayoan
*Attorney, Agent, or Firm*—Bacon & Thomas

[57] ABSTRACT

A conveyor belt, particularly suited to the food processing industry, includes a tension-bearing framework of transversely extending rods connected to tension bearing interconnected links into which is attached a series of loose-fitting modular product support members. The product support modules include forwardly and rearwardly extending link ends such that successive modules are interfitted with one another. Each of the forwardly and rearwardly extending link ends are provided with slotted longitudinal openings through which the transverse rods extend. The distance between a front wall portion defining the slot in a forwardly extending link end and a rear wall portion defining the slot in an associated rearwardly extending link end is greater than the fixed longitudinal spacing spanned by adjacent transverse rods so as to permit some relative longitudinal movement between the conveyor modules and the rods. In addition, at least one of the modules and the rods are provided with standoff elements which define a minimum contact area between the modules and the rods. This limited contact area creates larger openings between the conveyor modules and the rods such that when the conveyor belt is passed through a washing unit, washing sprays can effectively reach all surfaces. In addition, since the conveyor modules are permitted to shift longitudinally relative to the rods, this further enhances the elimination of debris trapping zones such that a highly sanitary conveyor belt arrangement is obtained. In addition, unique end cap members are provided to prevent relative rotation between drive links associated with the conveyor belt and the transverse rods.

20 Claims, 6 Drawing Sheets

CONVEYOR BELT

BACKGROUND OF THE INVENTION

1. Field of the Invention

The present invention pertains to the art of conveyors and, more particularly, to a conveyor belt incorporating open conveyor modules which are constructed in a manner which enhances cleanability thereof.

2. Discussion of the Prior Art

Conveyor belts constructed in various manners are known in the art. Many of these conveyor belts are formed from interconnecting symmetric conveyor modules by means of a plurality of longitudinally spaced rods which extend through respective portions of the modules. The rods are interconnected at their respective ends by linkages which cooperate with one or more driving units for moving the conveyor belt along a desired path.

Figure 1:
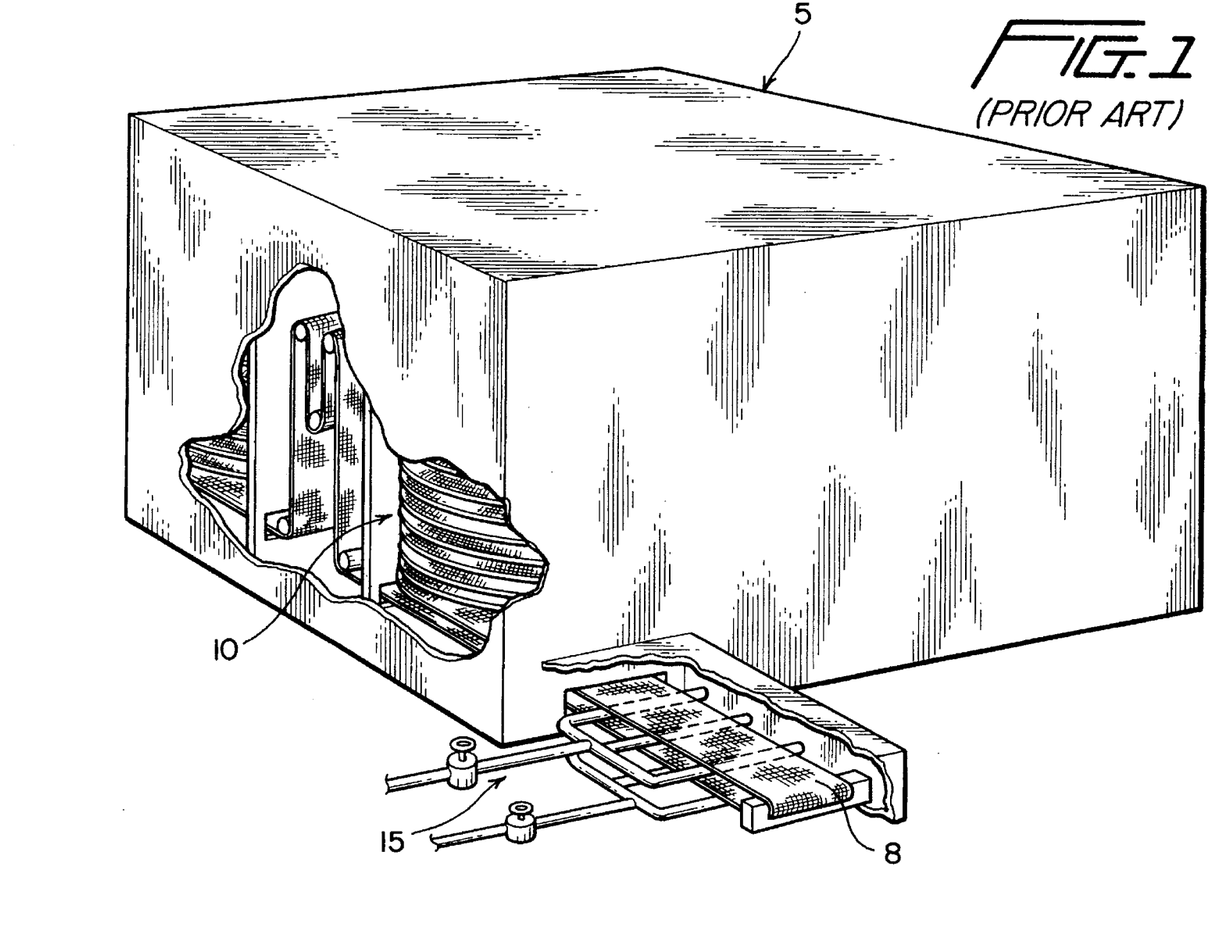
FIG. 1 is a partial sectional view of a spiral food cooling unit constructed in a manner known in the art.

When such conveyor belts are used in particular environments, such as in carrying food items for human consumption or other applications requiring sanitary operating conditions, the conveyor belts must be cleaned and inspected regularly for cleanliness. In many industries, government regulations require periodic inspection of conveyor cleanliness. When used in such environments, it is commonplace to incorporate a wash unit for the conveyor belt along the conveying path, generally in a zone immediately adjacent a work station where items are either initially placed on the conveyor or removed therefrom. By way of example, FIG. 1 illustrates a typical closed cooler compartment 5 used for refrigerating various food items placed upon a conveyor belt 8. In order to maximize storage capacity, such compartments 5 generally are constructed to permit movement of the conveyor belt 8 in a linear direction, as well as taking a helical spiralling path, such as generally indicated at 10, wherein successive layers of conveyor belt 8 are arranged atop one another. After conveyor belt 8 exits compartment 5 and reverses direction to again enter compartment 5, conveyor belt 8 proceeds through a washing unit generally indicated at 15. Washing unit 15 can spray water or other cleaning solutions on either one side or both sides of conveyor belt 8.

Depending upon the particular construction of the conveyor belt, the effectiveness of this cleaning operation can vary. Clearly, a conveyor belt formed of open modular units will permit the sanitizing fluid to flow therethrough which aids the cleaning process, however, there are various hard-to-clean joints, crevices and other debris trapping areas associated with known conveyor belts which can lead to unsanitary conditions. In addition, the actual material utilized in constructing the conveyor belt and the manner in which they are assembled in accordance with the known prior art often results in wear debris. The creation of wear debris can be an extremely serious problem if, for example, an open conveyor arrangement is used with a spiral food processing unit such that any debris from an upper conveyor belt layer can fall on food items or the like located on a lower conveyor belt layer. This can be a particular problem when the conveyor belts are formed entirely from metal with limited clearances between relatively moving parts.

One major debris trapping area associated with known conveyor belts incorporating open conveyor modules interconnected by longitudinally spaced rods in the manner described above, is the contact zone between the rods and front walls of forwardly extending link ends of the conveyor modules. In known prior art conveyor belt arrangements, the rods have line contact across the entire inner surface of the forwardly and rearwardly extending link ends such that the force transmitted through the drive units to the rods are transmitted to the modules. This keeps the rod and module surface contact areas tightly together, causing frictional wear debris when the belt rotates when negotiating vertical change of direction pulleys. This tight contact prevents effective removal of any wear debris and food particles because the engagement of rod and module blocks one side of the assembly to the wash spray from the other side. These surface contact areas represent a fair percentage of the overall surface area of the modules and therefore the inability to clean in these areas can result in less than desirable operating conditions from a sanitary/cleanliness standpoint.

Another problem associated with known conveyor belts that are adapted to conform to spiralling paths by the collapsing of the conveyor modules progressively towards an inner radial zone is that, since the outer radial drive links or modules are fully extended with tension applied thereto and the inner radial drive links or modules are collapsed and carry no tension, if relative rotation between the drive links or modules carried by any given rod is permitted, buckling of the conveyor modules can occur. If such buckling occurs in certain environments such as a spiral freezing unit, the articles placed on the conveyor belt can take an undesired shape and can create problems in packaging of the items. In many known conveyor belts utilizing metal drive linkages, heads are formed at the end of the rods and these heads are welded to the drive linkages. Unfortunately, due to fatigue loading, these welds often break which give rise to the problems outlined above, as well as repair costs and undesired down time of the conveying unit. Furthermore, these heads often evince burrs or the like which can damage the surfaces of frictional drive drums commonly used at the inner radial side of such conveyor belts in spiral cooling units.

Therefore, there exists a need in the art for a conveyor belt that can be used over both linear and curvilinear conveying paths which is constructed to enhance the cleanability of the conveyor assembly, as well as to minimize additional sanitary and operational deficiencies in known conveyor belt arrangements.

SUMMARY OF THE INVENTION

The present invention provides a conveyor belt, particularly suited to the food processing industry, that includes transversely extending rods attached to a series of loose-fitting modular product support units. The module units include forwardly and rearwardly extending link ends such that successive modules are interfitted with one another. Each of the forwardly and rearwardly extending link ends are provided with slotted longitudinal openings through which the transverse rods extend. The distance between a front wall portion of the forwardly extending link end and a rear wall portion of the rearwardly extending link end of the slots in any given modular section is longer than the fixed longitudinal spacing spanned by adjacent transverse rods so as to permit some relative longitudinal movement between the conveyor modules and the rods. In addition, at least one of the modules and the rods are provided with standoff elements which define the contact area between the modules and the rods so as to limit this contact area. This limited contact area creates larger openings between the conveyor modules and the rods as compared to the known prior art such that when the conveyor belt is passed through a washing unit, washing fluid can effectively reach all surfaces. In addition, since the conveyor modules are permitted to shift longitudinally relative to the rods, this further enhances the elimination of debris trapping zones such that a highly sanitary conveyor belt arrangement is obtained.

The conveyor belt of the present invention also incorporates a unique interconnecting arrangement between the transverse rods and drive links associated therewith such that the rods and the drive links are prevented from rotating relative to one another, but without the need for welding these pieces together. In the preferred embodiment, cap members are fixedly secured on the end of the transverse rods. The cap members incorporate projections which extend within enlarged areas of the apertures through which the transverse rods extend in the edge links. These cap members have been found to provide a larger and more suitably formed surface for use in combination with frictional inner edge driving units used for imparting drive to the conveyor belt through a turn and further effectively prevent relative rotation between the transverse rods and the edge links such that, when used in combination with a conveyor belt that traverses arcuate paths, the inner radial portions of the belt are prevented from buckling.

Additional features and advantages of the conveyor belt assembly of the present invention will become more readily apparent from the following detailed description of preferred embodiments thereof when taken in conjunction with the drawings wherein like reference numerals refer to corresponding parts of the several views presented.

DETAILED DESCRIPTION OF THE PREFERRED EMBODIMENTS

Figure 2:
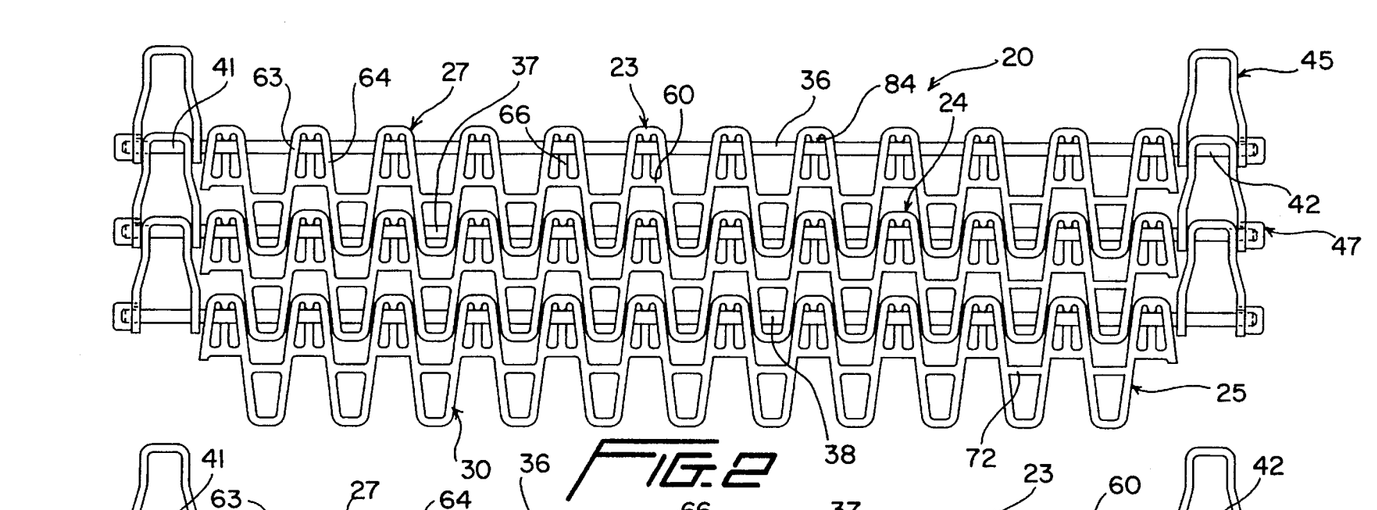
FIG. 2 is a top plan view of a section of the conveyor belt of the present invention.
Figure 3:
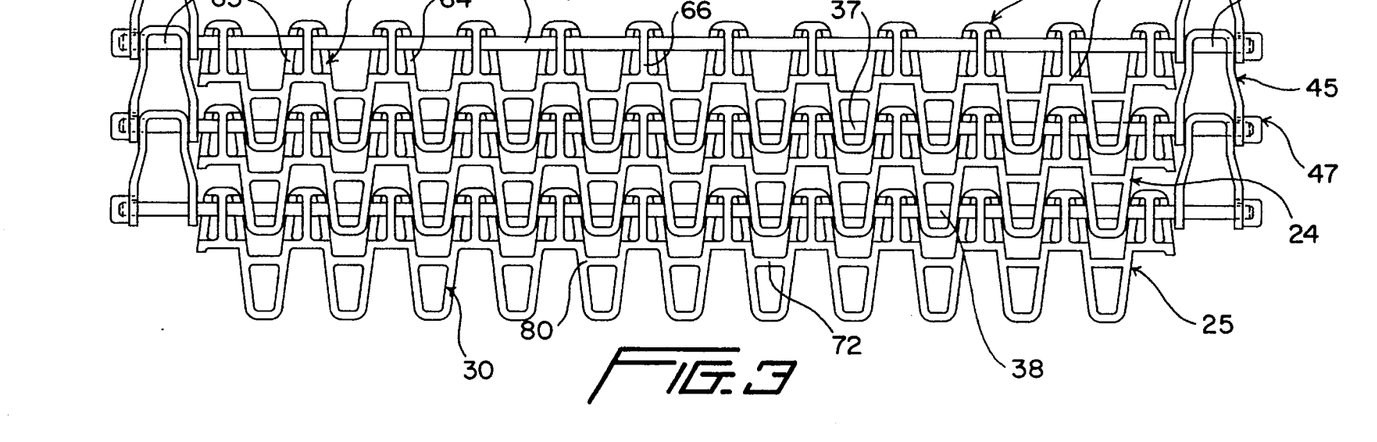
FIG. 3 is a bottom plan view of a section of the conveyor belt of the present invention.

With initial reference to FIGS. 2 and 3, a section of the conveyor belt 20 of the present invention is shown. Conveyor belt 20 includes a plurality of modular, item supporting units with modular units 23–25 being illustrated in these figures. Each modular unit 23–25 is generally formed of a plurality of laterally spaced and forwardly extending link ends 27 that are joined to a plurality of laterally spaced and rearwardly extending link ends 30. As clearly shown in these figures, modular units 23–25 are interfitted with the rearwardly extending link ends 30 projecting between the forwardly extending link ends 27 such that the forwardly extending link ends 27 and the rearwardly extending link ends 30 alternate laterally across modular units 23–25. The specific structural features of each modular unit 23–25 will be more fully discussed below with particular reference to FIGS. 4 and 5.

As also shown in FIGS. 2 and 3, conveyor belt 20 includes a plurality of laterally extending and longitudinally spaced rods 36–38 each of which are attached to the forwardly extending link ends 27 of one modular unit and the rearwardly extending link ends 30 on an adjacent modular unit. This interconnection between rods 36–38 and modular units 23–25 will also be more fully detailed below. Each rod 36–38 has opposing end portions 41 and 42 which extend through drive links 45. Each drive link 45 is secured to a respective end portion 41, 42 in a manner which prevents relative rotation therebetween by cap members 47. The structure of drive links 45 and cap members 47, as well as the manner in which they are interconnected, will be more fully outlined hereinafter.

Figure 4:
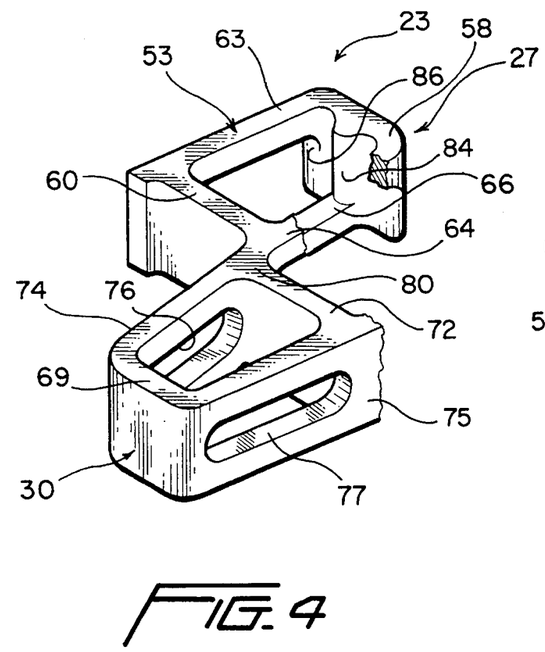
FIG. 4 is a perspective view of a section of a conveyor module incorporated in the conveyor belt of the present invention with portions thereof cut away for clarity.
Figure 5:
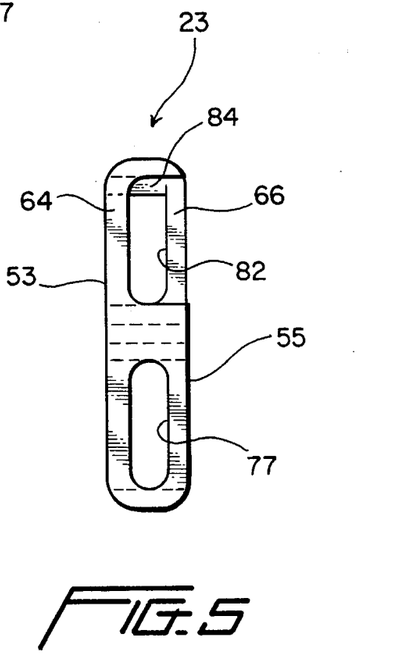
FIG. 5 is a side view of one of the conveyor modules incorporated in the conveyor belt of the present invention.

Specific reference will now be made to FIGS. 2–5 in describing the structure of each modular unit 23–25 as illustrated in the preferred embodiment shown in these figures. In accordance with this preferred embodiment, each modular unit 23–25 constitutes an integrally molded plastic member with a repeating sequence of forwardly and rearwardly extending link ends 27, 30. One such sequence of link ends for modular unit 23, as illustrated in FIG. 4, will now be described in detail and it is to be understood that the remaining sections of modular units 23–25 are similarly constructed. Each modular unit defines an upper surface 53 and a lower surface 55. Upper surface 53 is particularly adapted for supporting food items and the like that are transported by means of conveyor belt 20. Forwardly extending link end 27 is constituted by a laterally extending front wall 58 and a longitudinally spaced crosspiece 60 which are interconnected by laterally spaced and longitudinally extending upper surface defining side members 63 and 64 as well as a central lower surface defining member 66. Rearwardly extending link end 30 is constituted by a rear wall 69 and a cross piece 72 which are interconnected by sidewalls 74 and 75. Sidewalls 74 and 75 are preferably formed with longitudinally extending slots 76 and 77 respectively through which an associated one of rod 36–38 extends. Forwardly extending link end 27 and rearwardly extending link end 30 are interconnected in a joining zone 80.

As should be clearly evident from these figures, spaced upper surface defining side members 63 and 64 of forwardly extending link end 27 are vertically spaced from central lower surface defining member 66 so as to define a slot 82 therebetween through which an associated one of rods 36–38 can extend. As will be emphasized below, the distance between a forwardmost front wall of slot 82 and the rearwardmost walls of slots 76 and 77 is greater than the distance spanned by any adjacent pairs of rods 36–38 such that each modular unit 23–25 is permitted to shift longitudinally relative to rods 36–38 by a limited degree.

As shown in these figures, a standoff 84 in the form of a projection extends from an inner lateral surface portion 86 of front wall 58. In the preferred embodiment shown, standoff 84 is aligned with central lower surface defining member 66. With this construction, as is clearly evident from viewing FIG. 2, each rod 36–38 is prevented from engaging a majority of the surface area of inner lateral surface portion 86 but instead only abuts against standoffs 84. Therefore, gaps (not labeled) are created between inner lateral surface portion 86 of a corresponding front wall 58 of each forwardly extending link end 27 and a respective one of rods 36–38. As will be emphasized more fully below, the presence of standoffs 84 and the ability of modular units 23–25 to shift longitudinally relative to rods 36–38 greatly enhance the washability of conveyor belt 20 such that the highest degree of sanitary conditions can be maintained.

At this point, it should also be realized that other structures that perform the function of standoffs 84 could be provided without departing from the spirit of the invention. For instance, each forwardly extending link end 27 could be provided with a pair of spaced standoffs located below the spaced upper surface defining side members 63 and 64 respectively which would also function to maintain a gap between a substantial surface area of inner lateral surface portion 86 of front wall 58 and a respective rod 36–38. The presence of a single, centrally located standoff 84 is preferred since this minimizes the contact surface area. As indicated above, this contact area is a haven for debris that can be trapped between the rod and the front wall. Minimizing this contact area, as well as permitting the modular units 23–25 to shift relative to rods 36–38 essentially eliminates debris trapping zones. Again, these aspects of the invention will be emphasized more fully below.

Figure 6:
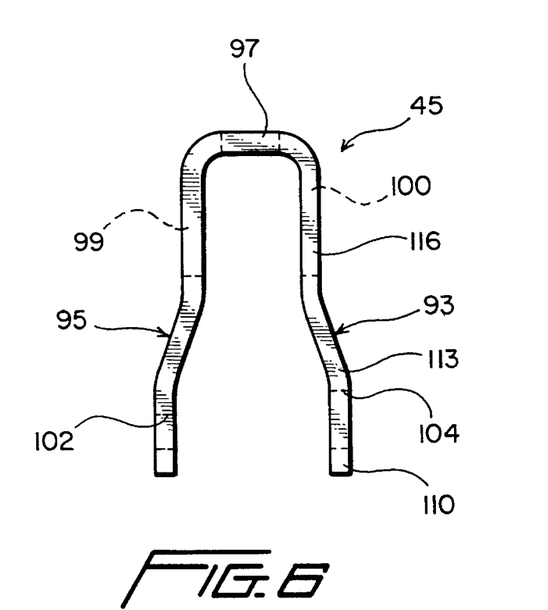
FIG. 6 is a top plan view of an edge link provided on the conveyor belt of the present invention.
Figure 7:
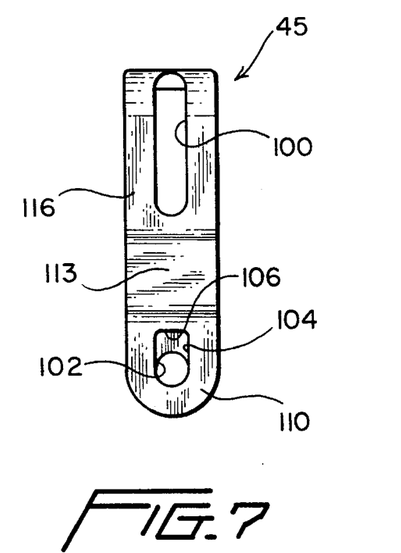
FIG. 7 is a side view of the edge link of FIG. 6.

Reference will now be made to FIGS. 6 and 7 in describing the preferred construction of each drive link 45 incorporated in the conveyor belt 20 of the present invention. Each drive link 45 includes an outer side portion 93 and an inner side portion 95 which are interconnected by an upper connecting portion 97. Outer side portion 93 and inner side portion 95 are provided with a pair of opposing slots, 99, 100. Inner side portion 95 is also provided with an aperture 102 and outer side portion 93 is provided with an enlarged aperture 104. Enlarged aperture 104 is aligned with aperture 102 and terminates at a forward portion thereof in a square-off end wall 106. In the preferred embodiment shown, both outer side portion 93 and inner side portion 95 are actually constituted by an aft longitudinally extending section 110 within which is provided the corresponding one of apertures 102 and 104, an inwardly tapering section 113 and a fore longitudinally extending section 116 which leads to upper connecting portion 97. This construction of drive links 45 is preferred since it enables successive drive links to collapse within one another such that conveyor belt 20 can negotiate a turn as will also be discussed below.

Figure 8:
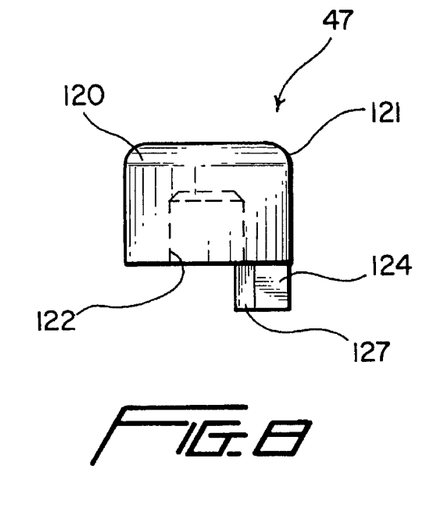
FIG. 8 is a side view of an end cap utilized in accordance with the present invention.
Figure 9:
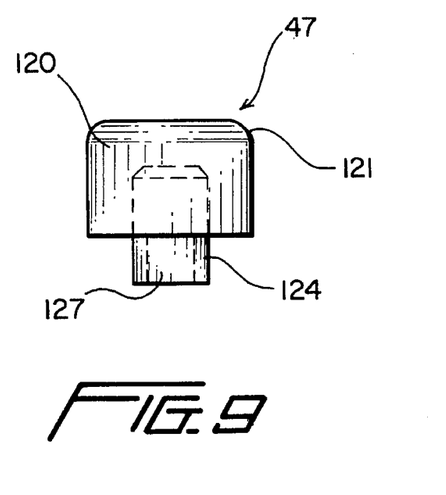
FIG. 9 is a side view of the end cap of FIG. 8 in a rotated position.
Figure 10:
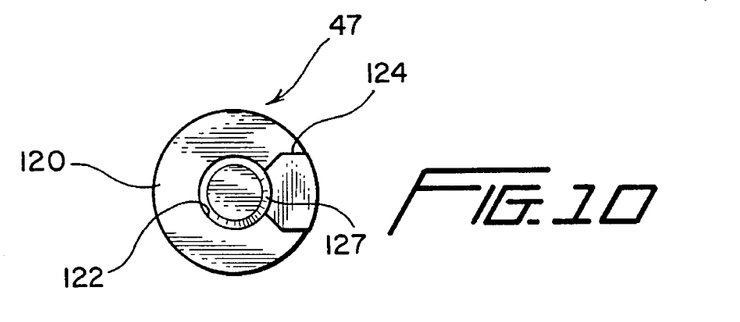
FIG. 10 is a bottom view of the end cap of FIG. 8.

Reference will now be made to FIGS. 8–10 in describing a preferred embodiment for cap members 47. Each cap member 47 includes a head 120 that has a smoothly curved annular portion 121. Head 120 is formed with a central bore 122 which is adapted to receive a corresponding end portion 41, 42 of one of rods 36–38. Actually, each cap member 47 can be fixedly secured to a respective rod 36–38 by any type of fastening arrangement known in the art, such as welding or through the use of adhesives. Each cap member 47 is also provided with a depending flange 124. In the preferred embodiment, depending flange 124 extends from the outer circumferential surface of head 120 to bore 122 in order that depending flange 124 is sufficiently sized to prevent breakage even under severe fatigue loading. Depending flange 124 therefore includes an arcuate central section 127 provided at central bore 122 and then can either taper out to the outer circumferential surface of head 120 as shown in FIG. 10 or the flange could simply extend straight from central bore 122 to the outer surface of head 120.

Figure 11:
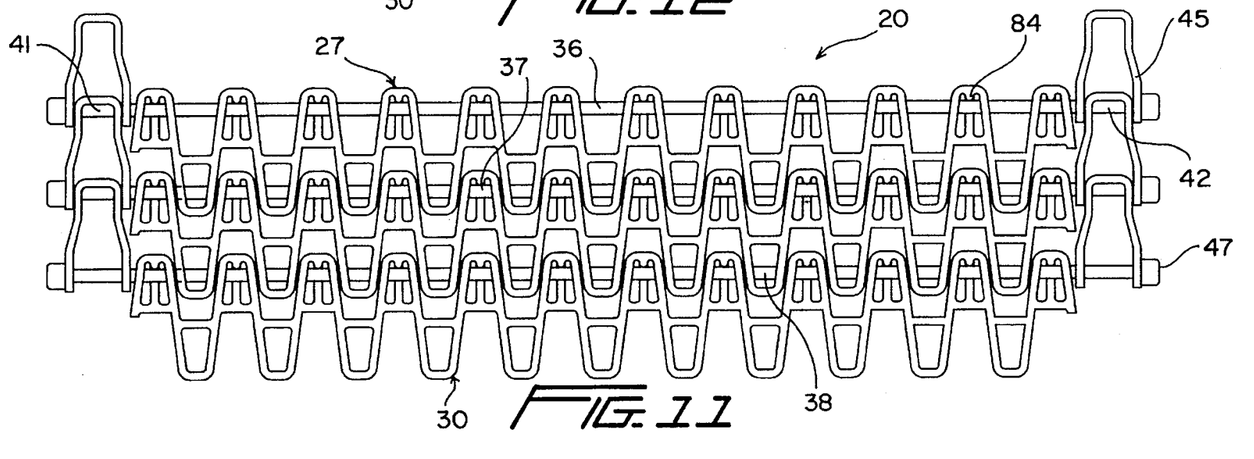
FIG. 11 is a top plan view of a portion of the conveyor belt of the present invention positioned in a linear traveling mode.
Figure 12:
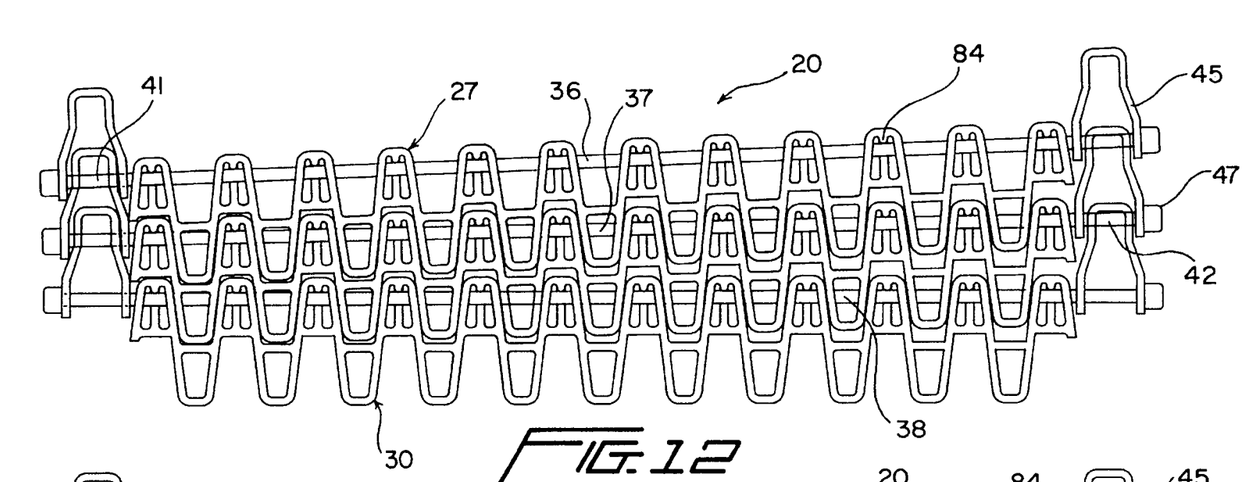
FIG. 12 is a top plan view of a portion of the conveyor belt of the present invention positioned in taking an arcuate travel path.

Reference will now be made to drawings, particularly FIGS. 11 and 12, in discussing the various configurations that conveyor belt 20 can take during operation thereof given the preferred construction as discussed above. FIG. 11 illustrates the relative positioning between the various modular units 23–25, rods 36–38 and drive links 45 when conveyor belt 20 is moving along a straight path. As clearly illustrated, each rod 36–38 only engages standoffs 84 of forwardly extending link ends 27 in passing through slots 82. Each rod 36–38 actually passes through a line of forwardly extending link ends 27 as well as a line of rearwardly extending link ends 30 and, more particularly, through slots 76, 77 and 82. Each rod 36–38 then extends through aperture 102 in a respective drive link 45, slots 99 and 100 in another drive link 45 and finally through aperture 104 in the first mentioned drive link. An cap member 47 is provided at each end of the respective rods 36–38 with the end of the rods being fixed within a respective bore 122 of a given cap member 47. In addition, depending flange 124 projects within enlarged aperture 104 in order to prevent relative rotation between each drive link 45 and its respective rod 36–38. The drive link 45 on the other end of each rod 36–38 is likewise secured against relative rotation such that the pair of drive links 45 secured to any given rod 36–38 can only rotate in unison. This is extremely important in order to prevent the potential of buckling of conveyor belt 20 as conveyor belt 20 traverses an arcuate path. When traversing an arcuate path, conveyor belt 20 is permitted to collapse so that it assumes the position generally shown in FIG. 12. In this Figure, the left side end of conveyor belt 20 is fully collapsed and the right hand side is still fully extended.

At this point, it should be realized that conveyor belt 20 is driven, in the preferred embodiment, by means of drive sprockets (not shown) which directly engage rods 36–38 by sprocket teeth projecting through openings in drive links 45. When conveyor belt 20 is driven in a linear path such that it assumes the position shown in FIG. 11, drive links 45 on both sides of conveyor belt 20 thus carry the entire belt tension. Of course, it should be recognized that other drive links could be provided intermediate the end of rods 36–38 and, in addition, multiple laterally spaced modules could be provided on common rods. However, when conveyor belt 20 is used in a helically spiraling conveyor, for example, and traverses an arcuate path, it assumes the position shown in FIG. 12, and only the drive links 45 on the right-hand side of this figure are continuously carrying tension from a drive sprocket, while the cap members 47 on the left-hand side are driven by frictional engagement with an inner rotary drive drum (not shown). Such types of drive sprocket/drum arrangements are widely known in the art, do not form part of the present invention and therefore have not been illustrated. However, it should be noted that the particular construction of conveyor belt 20 advantageously prevents undesirable buckling of the conveyor belt 20 when it traverses an arcuate path as illustrated in FIG. 12. Since only the right-hand side drive links 45 are in tension as opposed to the drive links 45 shown on the left-hand side of this Figure, if relative rotation were permitted between the left and right-hand drive links 45, the drive links 45 on the left-hand side could rotate relative to the drive links on the right-hand side and cause undesirable buckling of modular units 23–25 which would present an uneven supporting surface for the food items and could also deform the food items which makes packaging difficult. By having flange 124 of cap members 120 extend within drive links 45 and yet be fixedly secured to rods 36–38, this relative rotation is prevented. In addition, since cap members 47 are preformed, they can be readily made with the smoothly curved annular portions 121 so that no burrs or rough edges are provided which could deform or otherwise alter the functioning characteristics of the inner drive drum used to frictionally engage the inner radial edge of conveyor belt 20 as conveyor belt 20 traverses an arcuate path. In addition, it is possible to form cap members 120 in a predetermined configuration such that they cooperate with a specifically configured inner drive drum to convey driving force to conveyor belt 20.

When conveyor belt 20 proceeds through a washing unit, such as that discussed above with reference to FIG. 1, conveyor belt 20 will proceed along a linear path as represented in FIG. 11. As washing and sanitizing fluids are sprayed onto conveyor belt 20, either from one side or both sides thereof, the gaps maintained between rods 36–38 and inner lateral surface portion 86 of each forwardly extending link end 27 enable superior washing of this zone and, in addition, given the fact that the distance between a forwardmost portion of slot 82 and rearwardmost portions of slots 76 and 77 in the direction of travel of conveyor belt 20 is greater than the distance spanned by adjacent pairs of rods 36–38, each modular unit 23–25 will be permitted to shift longitudinally relative to rods 36–38 which further assures the entire zone will be adequately cleansed. In addition, this relative shifting between modular units 23–25 and rods 36–38 further assure that tension provided on each modular unit 23–25 by the respective rods 36–38 as conveyor belt 20 traverses along a desired path will not be successively transmitted and accumulated between successive modular units 23–25.

Figure 13:
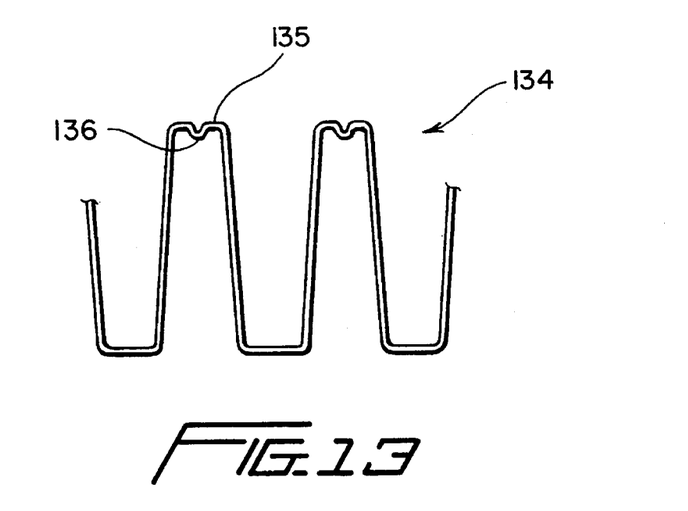
FIG. 13 is a top plan view of a portion of a conveyor module constructed in accordance with a second embodiment of the present invention.
Figure 14:
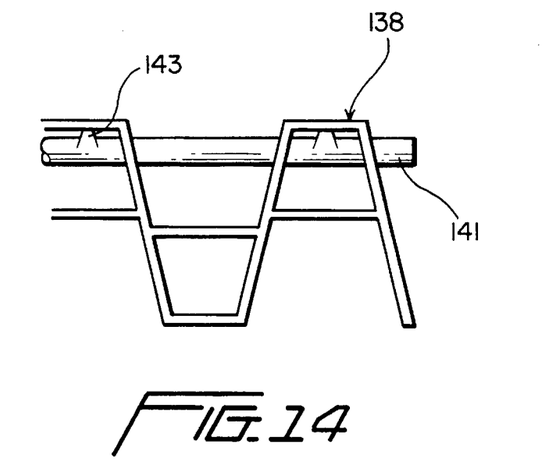
FIG. 14 is a partial plan view of a section of a conveyor module and transverse rod constructed in accordance with a still further embodiment of the conveyor belt of the present invention.
Figure 15:
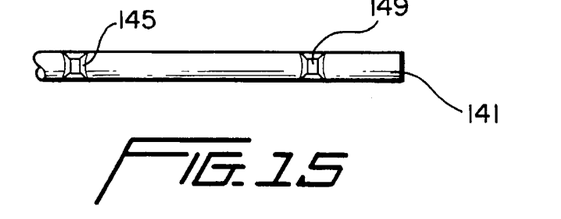
FIG. 15 is a top plan view of the transverse rod illustrated in FIG. 14.

In the preferred embodiment described above, each modular unit 23–25 is formed from molded plastic. Rods 36–38, drive links 45 and caps members 47 are preferably formed of metal. In the embodiment illustrated in FIG. 13, a modular unit 134 constructed in accordance with the present invention is formed from a bent piece of metal. In this embodiment, front walls 135 of modular unit 134 are formed with bent or stamped standoffs 136. As in the embodiment described above, similar forward and rearward slots would also be provided although not shown in this Figure.

FIGS. 14–16*a* illustrates another embodiment constructed in accordance with the present invention wherein a modular unit 138 cooperates with a rod 141 provided with projections 143 in order to maintain the desired gap between rod 141 and modular unit 138. In this embodiment both modular unit 138 and rod 141 are preferably formed from plastic with projections 143 being integrally formed with rod 141 and including angled sidewalls 145 and a surface bearing top 149.

Figure 16A:
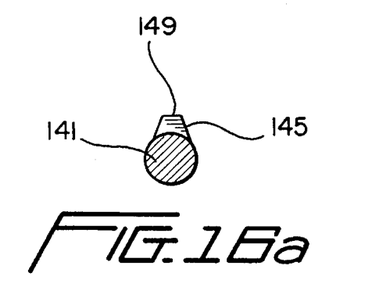
FIG. 16a is a cross-sectional view of the transverse rod of FIG. 15.
Figure 16B:
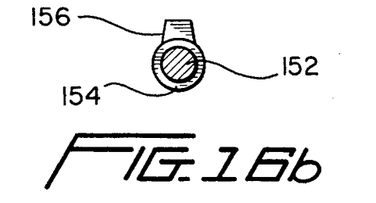
FIG. 16b is a cross-sectional view of a transverse rod unit constructed in accordance with another embodiment of the present invention.
Figure 16C:
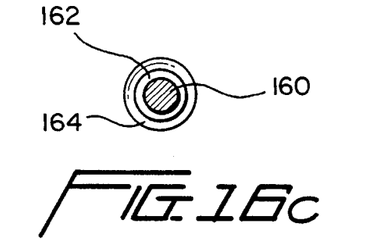
FIG. 16c is a cross-sectional view of a transverse rod constructed in accordance with a fourth embodiment of the invention.
Figure 17A:
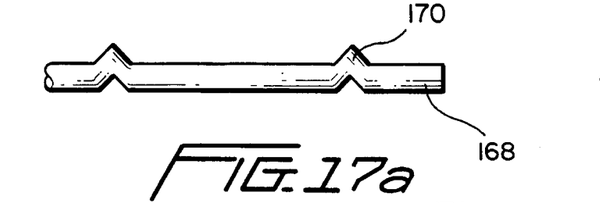
FIG. 17a is a plan view of a section of a transverse rod constructed in accordance with a fifth embodiment of the invention.
Figures 17B, 17C:
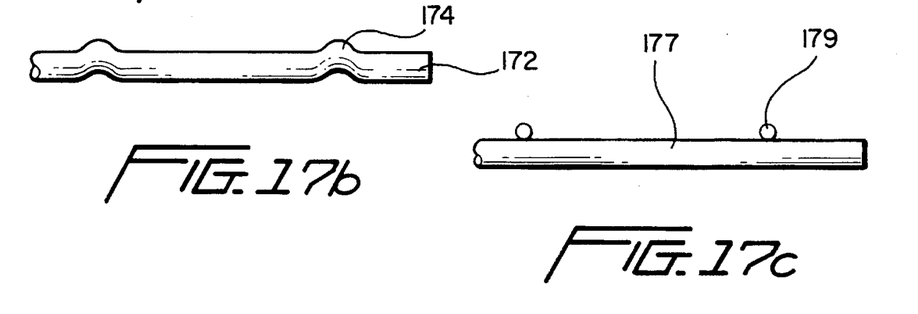
FIG. 17b is a plan view of a section of a transverse rod constructed in accordance with a sixth embodiment of the invention.
FIG. 17c is a plan view of a section of a transverse rod constructed in accordance with a sixth embodiment of the invention.

FIGS. 16*b*–17*c* illustrate additional embodiments for rods that can be utilized in the conveyor belt of the present invention. In the embodiment of FIG. 16*b*, a rod 152 is inserted within a sleeve 154 that has projections 156. In this embodiment, rod 152 is preferably formed from metal and sleeve 154 and projections 156 are preferably integrally molded of plastic. In the embodiment illustrated in FIG. 16*c*, a metal rod is provided with a plastic sleeve 162 that is provided with laterally spaced, annular projections 164 that are integrally molded with the sleeve 162. The embodiments illustrated in FIGS. 17*a*–17*c* represent other metal rod embodiments constructed with the present invention. In FIGS. 17*a*, a metal rod 168 is formed with stamped projections 170; in FIG. 17*b*, metal rod 172 is bent to form standoffs or projections 174; and in FIG. 17*c*, metal rod 177 has fixedly secured thereto, by welding or other known fastening arrangements, a plurality of laterally spaced beads 178 which function as standoffs.

From the above description, it should be recognized that the conveyor belt of the present invention provides for enhanced cleanability such that higher standards of sanitary conditions than have heretofore been known in this environment can be obtained, as well as a mechanically sound conveyor belt construction. Although described with respect to the preferred embodiments of the invention, it should be readily understood that changes and/or modifications can be made without departing from the spirit of the invention. In general, the invention is only intended to be limited by the scope of the following claims.

I claim:

1. A conveyor belt comprising:

a plurality of laterally extending and longitudinally spaced rods, each of said rods having first and second laterally spaced end portions;

a plurality of interfitted, open conveyor modules, each of said modules including a plurality of integrally formed forwardly and rearwardly extending link ends that alternate laterally across said module, each of said forwardly and rearwardly extending link ends being provided with through holes located between upper and lower surfaces thereof, each of said plurality of rods extending through the through holes provided in forwardly extending link ends of a respective one of said modules and the through holes provided in the rearwardly extending link ends of an adjacent one of said modules that is interfitted with said one of said modules; and standoff means for maintaining a gap between a lateral surface portion of a corresponding front wall of each of the forwardly extending link ends and a respective one of said plurality of rods.

2. The conveyor belt according to claim 1, wherein the through holes provided in each of the forwardly extending link ends are constituted by longitudinally extending slots.

3. The conveyor belt according to claim 2, wherein the through holes provided in each of the rearwardly extending link ends are constituted by longitudinally extending slots, the slots in said forwardly and rearwardly extending link ends having a combined associated length, defined as the distance between a forwardmost portion of the slot in said forwardly extending link end and the rearwardmost portion of the slot of the rearwardly extending link end, is greater than the distance spanning adjacent ones of said plurality of rods such that each of said modules are permitted to shift longitudinally relative to said plurality of rods.

4. The conveyor belt according to claim 1, wherein said standoff means comprises a plurality of projections that extend rearwardly from the lateral surface portions of selected ones of said forwardly extending link ends of each of said modules.

5. The conveyor belt according to claim 4, wherein said modules are formed of plastic and said projections are integrally formed with the modules.

6. The conveyor belt according to claim 4, wherein said modules are made of metal and said projections are formed from bent sections of the front wall of each of said forwardly extending link ends.

7. The conveyor belt according to claim 4, wherein said plurality of projections are located centrally along respective said lateral surface portions.

8. The conveyor belt according to claim 4, wherein said standoff means is integrally formed with said modules.

9. The conveyor belt according to claim 1, wherein said standoff means comprises a plurality of laterally spaced and aligned projections extending from each of said plurality of rods, said projections being engaged with a predetermined area of the lateral surface portion of selected ones of said forwardly extending link ends.

10. The conveyor belt according to claim 9, wherein said projections are integrally formed with said plurality of rods.

11. The conveyor belt according to claim 9, wherein said standoff means further includes a sleeve member through which an associated one of said plurality of rods extends, said projections being formed integral with and extending directly from said sleeve member.

12. The conveyor belt according to claim 11, wherein said projections extend angularly about said sleeve member at laterally spaced locations.

13. The conveyor belt according to claim 9, wherein said projections are defined by bent portions of said plurality of rods.

14. The conveyor belt according to claim 9, wherein said projections are defined by auxiliary members which are fixedly secured to said plurality of rods.

15. The conveyor belt according to claim 1, wherein said conveyor belt further comprises a plurality of drive links, each of said drive links extending between and being attached to a respective adjacent pair of said plurality of rods at a respective one of the first and second end portions of said adjacent pair of said plurality of rods.

16. The conveyor belt according to claim 15, wherein each of said drive links includes at least one side wall having a fore section and an aft section each of which is provided with an aperture through which a respective one of said adjacent pair of said plurality of rods extends such that each of said plurality of rods extends through both the aperture provided in the fore section of one of said drive links and the aperture provided in the aft section of another one of said drive links, said conveyor belt further comprising means for preventing relative rotation between each of said drive links and one of said adjacent pair of said plurality of rods.

17. The conveyor belt according to claim 16, wherein said means for preventing relative rotation comprises a plurality of cap members each of which is fixedly secured to a respective one of the first and second end portions of said plurality of rods, each of said cap members being provided with an integral flanged portion that engages a respective one of said drive links.

18. The conveyor belt according to claim 17, wherein the aperture provided in the fore section of each of said drive links comprises a longitudinally extending slot and the aperture provided in the aft section of each of said drive links receives both a respective one of said plurality of rods and the flange portion of a respective one of said cap members.

19. A conveyor belt comprising:
a plurality of laterally extending and longitudinally spaced rods, each of said rods having first and second laterally spaced end portions;
a plurality of interfitted, open conveyor modules, each of said modules including a plurality of integrally formed forwardly and rearwardly extending link ends that alternate laterally across said module, each of said forwardly and rearwardly extending link ends being provided with through holes located between upper and lower surfaces thereof, each of said plurality of rods extending through the through holes provided in forwardly extending link ends of a respective one of said modules and the through holes provided in the rearwardly extending link ends of an adjacent one of said modules that is interfitted with said one of said modules;
a plurality of drive links, each of said drive links extending between and being attached to a respective adjacent pair of said plurality of rods at a respective one of the first and second end portions and interior portions of said adjacent pair of said plurality of rods wherein each of said drive links includes at least one side wall having a fore section and an aft section each of which is provided with an aperture through which a respective one of said adjacent pair of said plurality of rods extends such that each of said plurality of rods extends through both the aperture provided in the fore section of one of said drive links and the aperture provided in the aft section of another one of said drive links; and
means for preventing relative rotation between each of said drive links and one of said adjacent pair of said plurality of rods, wherein said means for preventing relative rotation comprises a plurality of cap members each of which is fixedly secured to a respective one of the first and second end portions of said plurality of rods, each of said cap members being provided with an integral flanged portion that engages a respective one of said drive links.

20. The conveyor belt according to claim 19, wherein the aperture provided in the fore section of each of said drive links comprises a longitudinally extending slot and the aperture provided in the aft section of each of said drive links receives both a respective one of said plurality of rods and the flange portion of a respective one of said cap members.

* * * * *